United States Patent [19]

Saito et al.

[11] 4,347,604

[45] Aug. 31, 1982

[54] BI-DIRECTIONAL DATA COMMUNICATIONS SYSTEM

[75] Inventors: Masaki Saito; Tetuo Kanazashi, both of Tokyo, Japan

[73] Assignee: Pioneer Electronic Corporation, Tokyo, Japan

[21] Appl. No.: 156,532

[22] Filed: Aug. 5, 1980

[30] Foreign Application Priority Data

Jun. 8, 1979 [JP] Japan .................................. 54-72514

[51] Int. Cl.³ .............................................. H04J 3/06
[52] U.S. Cl. ...................................... 370/85; 370/100
[58] Field of Search ............................ 370/85, 86, 100

[56] References Cited

U.S. PATENT DOCUMENTS

| | | | |
|---|---|---|---|
| 3,969,586 | 7/1976 | Wakamatsu | 370/85 |
| 4,052,566 | 10/1977 | MacKay | 370/85 |
| 4,053,714 | 10/1977 | Long | 370/85 |
| 4,149,144 | 4/1979 | Diefenderfer | 370/85 |
| 4,156,112 | 5/1979 | Moreland | 370/85 |
| 4,229,792 | 10/1980 | Jensen et al. | 370/85 |
| 4,241,444 | 12/1980 | Kister | 370/85 |

*Primary Examiner*—Gerald L. Brigance
*Attorney, Agent, or Firm*—Sughrue, Mion, Zinn, Macpeak & Seas

[57] ABSTRACT

A bi-directional data communications system including a single center facility and plural terminal control devices. A pair of up-data and down-data lines connect the central facility and the plural terminal control devices. Each of the terminal control devices includes a counter in which a specific numerical value is preset. A cycle start frame signal and data synchronizing frame signals are transmitted through the down-data line to the counter. The counter counts down from the preset value in response to the data synchronizing frame signals starting from a time determined by the cycle start frame signal. Transmission and reception of data are simultaneously carried out between the center facility and the terminal control device when the preset value and the number of the data synchronizing frame signals which have been counted are coincident.

6 Claims, 4 Drawing Figures

BI-DIRECTIONAL DATA COMMUNICATIONS SYSTEM

BACKGROUND OF THE INVENTION

The present invention relates generally to a bi-directional data communications system. Various types of bi-directional data communications systems have been developed in which a single center facility and plural terminal units are interconnected via cables or radio links. Data signals are transmitted or received from the central facility to the terminal units or vice versa periodically at predetermined time intervals or at a desired time thereby carrying out bi-directional data communications. A typical example of such a bi-directional data communciation system is a community antenna television system (CATV system) which will be described with reference to FIG. 1. In this system, terminal units 28 are provided, for instance, in several ten thousands of homes 2 which are coupled to a single center 1. The center 1 and the terminal units 28 form one set or group. The center 1 is connected through coaxial cables to the terminal units 28 in the homes 2. A main cable 3 extends from the center 1. Main cable amplifiers 4 and branching units 5 are provided along the main cable 3 at predetermined points. Plural branch cables 6 extend from each branching unit 5. Extension cable amplifiers 7 and taps 8 are provided along each branch cable 6 at predetermined positions. Plural auxiliary branch cables 9 extend from each tap 8 with the auxiliary branch cables 9 leading into the homes 2. Provided in each home 2 is a terminal unit 28 including a converter 10, a television set 11 and a control box 12. The end of an auxiliary branch cable 9 is connected to the converter 10 which is in turn connected to the television set 11 and control box 12. In this fashion, the main cable from the center 1 connects the center 1 to the terminal units in the homes 2.

A signal receiving antenna 13 is installed outside the center 1. The antenna 13 is connected to a demodulator 15 in a source group 14. The source group 14 includes a video disc player 16, a video tape recorder 17, a studio 18 and other such equipment as desired. Signals from the source group 14 are applied to a modulation and transmission section 19. The section 19 includes two systems. One of the two systems includes an IF modulation circuit 20, a scrambling circuit 21, and an up-converter circuit 22 while the other includes an IF modulation circuit 23 and an up-converter circuit 24. The outputs of the up-converter circuits 22 and 24 are connected to the main cable 3. The main cable 3 is connected to a transmitter-receiver 25 which communicates with the converters 10. The transmitter-receiver 25 is connected to a computer 26 which is connected to peripheral equipment 27 such as a printer and a display unit.

The operation of the CATV system thus constructed will now be described. First, the switch of the television set is turned on and the television set is set to a predetermined designated channel which is preferably not used by local over-the-air stations. The control box 12 is then operated so that the frequency of a desired channel to be received is converted into that of the designated channel by the converter 10. The channels which can be selected by the control box can be classified into a group A channels of which television signals are received over the air and retransmitted without modification, a group B of channels of independent programs provided free of charge and a group C of channels of chargeable programs. Each group has several corresponding channels. Typically, selection can be made from about twenty to thirty channels.

For the group A, a television signal received by the signal receiving antenna 13 is demodulated by the demodulator 15 and then applied to the modulation and transmission section 19. The signal is modulated by the IF modulation circuit 23. The frequency of the signal thus modulated is increased to a predetermined value by the up-converter circuit 24. Thus, the television signal received is changed into a signal upon a desired channel which is then transmitted through the main cable 3, the branch cables 6 and the auxiliary branch cables 9 to the television sets 11.

The independent programs of group B are for instance weather forecast programs and news programs. A television signal provided by the video disc player 16 or the video tape recorder 17 or a television signal from a live program produced in the studio 18 is modulated and frequency-multiplied by the IF modulation circuit 23 and the up-converter circuit 24 into a television signal upon the desired channel which is applied to the main cable 3. The independent programs are free of charge irrespective of the number of times of television signal reception or the period of time of television signal reception. Each subscriber can receive the television signals for a basic monthly charge.

The chargeable programs of group C are typically new movie programs, special programs, or the like. A television signal provided by the video disc player 16 or the video tape recorder 17, or a television signal from a live program produced in the studio 18 is modulated by the IF modulation circuit 20. A scrambling synchronizing signal of predetermined form is added to the video signal in the television signal by the scrambling circuit 21. Because of this signal, if the television signal is received only as it is by the television set, it is impossible to reproduce normal pictures on the television set. The television signal thus treated is applied to the up-converter 22 where its frequency is increased to the frequency of a designated channel. The television signal thus processed is supplied to the main cable 3.

Upon receiving the television signal of the chargeable program by the television set in each home 2, the scrambled television signal is converted into a normal video signal by the converter 10 so that normal pictures can be observed on the television set 11. Whenever a chargeable program is received, a predetermined fee is charged to the subscriber. The sum of the monthly basic charge and the special use fee is billed to the subscriber.

In order to determine whether received programs are free of charge or not, it is necessary to detect what subscribers have used what channels for particular periods of time. For this purpose, the transmitter-receiver 25 outputs a retrieving signal at predetermined time intervals to address the converter 10 in each terminal unit with an address number assigned to that particular terminal unit to determine if a group C channel is being used at the retrieval time. In response to this, the converter 10 sends to the transmitter-receiver 25 an answering signal representative of the channel which is in use at the retrieval time. The charge data transmitted and received by the transmitter-receiver 25 is arranged and stored by the computer 26 and displayed or printed out by the peripheral equipment 27. As the retrieving signal is transmitted at fixed predetermined time intervals of typically several seconds to several tens of seconds, audience ratings can also be immediately calculated.

A subscriber can take part in programs by operating his control box 12. While watching the television set 11 the subscriber's choice or answer is encoded and sent through the coaxial cables to the center 1.

In the bi-directional data communications system as described above, a polling method is normally employed in which the center facility sends a calling signal (hereinafter referred to as "a down data signal") to each of the terminal units 28 individually and the identified terminal unit 28 responds to the down data signal by sending an answering signal (hereinafter referred to as "an up data signal") back to the center. A single cable or radio frequency or a single optical fiber is employed for transmission and reception of such data. According to the polling method, each of the terminal units 28 continuously monitors the down data signal to determine whether or not the address code identifying the terminal unit is present or not. The terminal unit responds only when the identified address code is received at which time the up data signal is transmitted. The down data signal transmitted from the center facility 1 contains various data to be transmitted to the terminal units 28 together with the address codes.

This bi-directional data communication system using a polling method is effective when the terminal units 28 are distributed over a relatively extensive area and where data communications are carried out for a large number of terminal units. If the distance between the center 1 and the terminal unit 28 is long, a relatively long time is required to transmit the data signal. That is, the time required for data communications between the center 1 and the various terminal units 28 differs depending on the distance between the center 1 and each terminal unit. Accordingly, it is impossible to receive the return up data signals at the same intervals at which the down data signals were transmitted. In addition, if a large number of terminal units 28, about several ten thousands or more, for example, are operated with a single center facility, it may be desirable to perform polling with respect only to arbitrarily selected terminal units in conformity with the kinds of the data being transmitted or the type of terminal unit. Accordingly, it is advantageous in that effective utilization of the system is possible even if a large number of the terminal units 28 are used.

On the other hand, bi-directional communications using the polling method is disadvantageous in that each terminal unit has to monitor the down data signal at all times as previously mentioned. For this reason, the construction of such a system is complicated and the cost of the system is high. However, in a relatively small system having about two to four thousand terminal units which are located in a limited area, there is very little transmission time involved in transmitting data between the center 1 and the terminal units so that insertion of the address codes into the down data signal does not lower the efficiency of the overall system.

SUMMARY OF THE INVENTION

In view of the foregoing, an object of the present invention is to provide a bi-directional data communications system in which a pair of transmission lines is used, one for transmitting up data and the other for transmitting down data, in which the construction of the terminal unit is simplified and the efficiency of the system is maximized for a small scale system.

In accordance with this and other objects of the invention, there is provided a bi-directional data communications system including a single center facility and plural terminal control devices connected by both an up-data line and a down-data line. Each terminal control device includes a counter which has been preset with a specific numerical value particular to that terminal control device. The counter is initialized by a cycle start frame signal after receipt of which it begins to count downward in response to each data synchronizing frame signal received. Both the cycle start frame signal and data synchronizing frame signals are transmitted upon the down-data line. Once a zero count is reached, transmitting and receiving operations are simultaneously carried out between the center facility and the particular terminal control device. Alternatively, the counter can be made to count upwards and the count value compared with a pre-stored value which is particular to the terminal unit. Instead of wire lines, two different radio frequencies or two different optical fibers may be used.

DESCRIPTION OF THE PREFERRED EMBODIMENTS

A preferred embodiment of the present invention will now be described with reference to the accompanying drawings.

Figure 1:
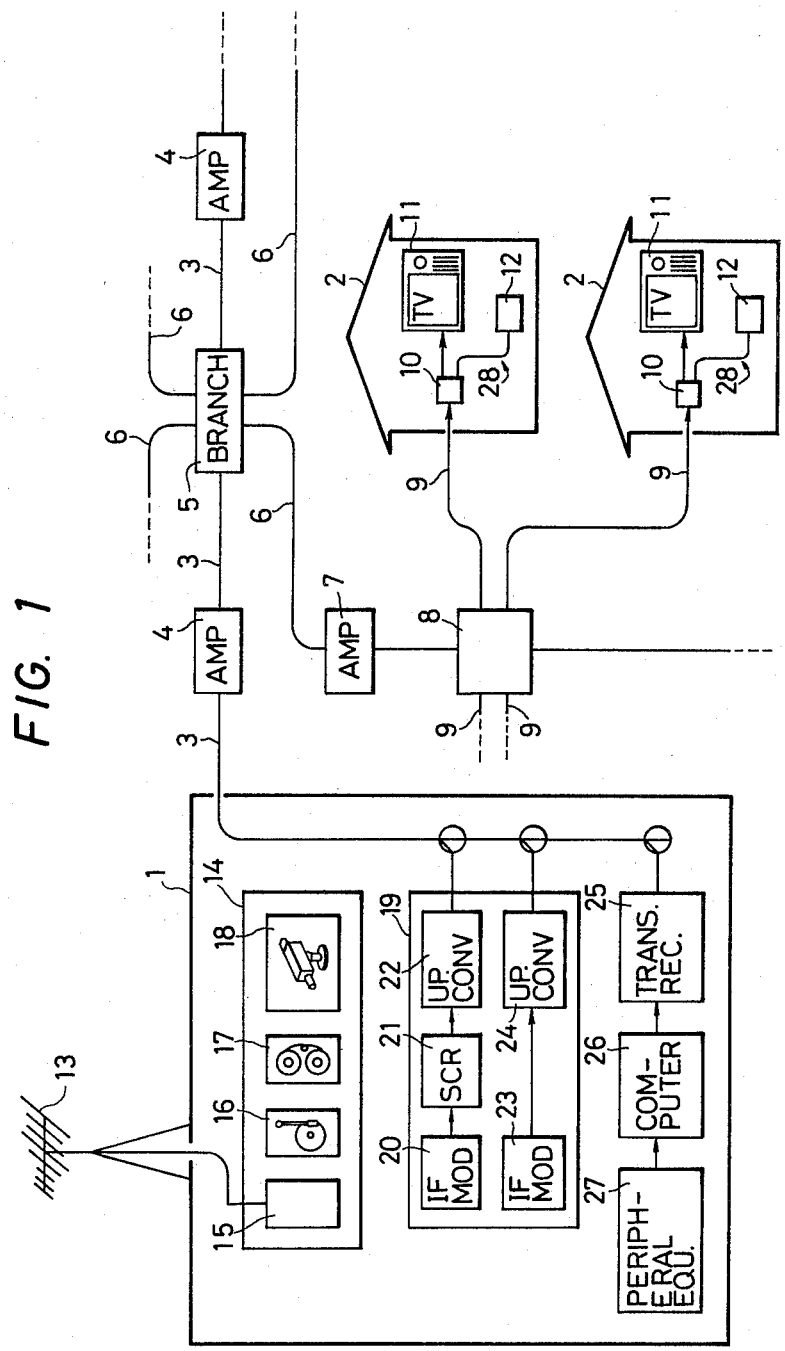
FIG. 1 is an explanatory diagram showing the basic components of a CATV system.
Figure 2:
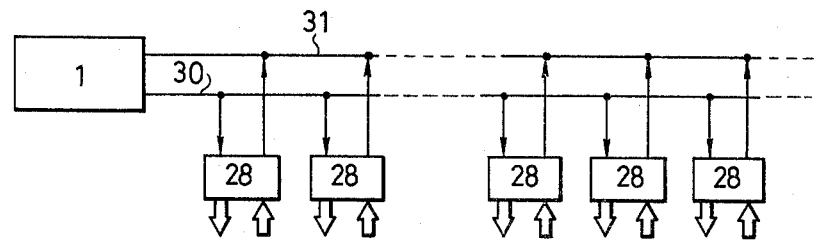
FIG. 2 is a block diagram for illustrating the principles of operation of the present invention.

FIG. 2 is a block diagram illustrating the principles of operation of the present invention in which a single center 1 and plural terminal units 28 are connected by a pair of lines 30 and 31. The lines 30 and 31 are used exclusively for transmitting down and up data signals, respectively. Specifically, the line 30 serves to transmit data from the center 1 to the terminal units 28 while the line 31 serves to transmit data from each of the terminal units 28 to the center 1.

Figure 3:
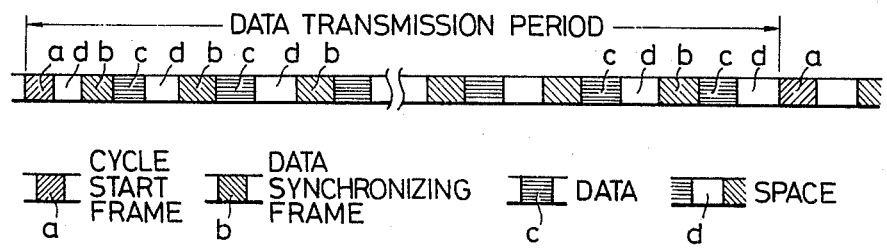
FIG. 3 is an explanatory diagram showing the timing of the data transmission and reception used in a preferred embodiment of the invention.

Referring to FIGS. 2 and 3, a cycle start frame signal a and data synchronizing frame signals b are transmitted upon the line 30 from the center 1 to the terminal units 28. The cycle start frame signal a is transmitted at a predetermined constant interval and the data synchronizing frame signals b are transmitted periodically at a fixed interval between adjacent cycle start frame signals a. The terminal units 28 are preset so as to operate only at times which are different for each terminal unit. A terminal unit 28 responds to the down data signal by counting the number of data synchronizing frame signals which have occurred since the last cycle start frame signal.

As can be appreciated from FIG. 3, the cycle start frame signal a is transmitted with a relatively long period. During a single period of the cycle start frame signal a, all of the terminal units 28 may be called and there is sufficient time for each to answer. During a single period of the cycle start frame signal a, data synchronizing frame signals b are generated periodically at a fixed interval with the number data synchronizing frame signals transmitted being equal to that of the number of terminal units 28. After the occurrence of each of the synchronizing frame signals b, transmission of the data signal c is performed by the corresponding terminal unit. Between the adjacent data synchronizing frame signals b, a space d occurs together with the data signal c. No signal is contained in the space d. A time lag caused by a possible miscount by one or more of the terminal units 28 or transmission time lags is absorbed in the space d.

Figure 4:
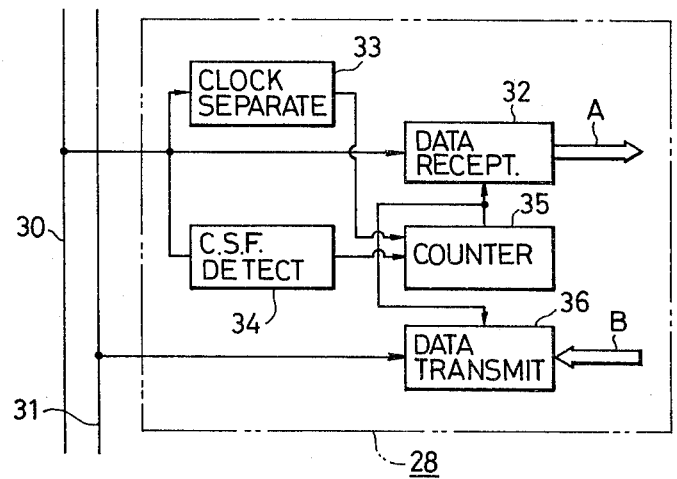
FIG. 4 is a block diagram of a terminal unit located in subscriber's home.

FIG. 4 is a block diagram showing the construction of a terminal unit 28 which is independently operable and is capable of transmitting and receiving data. The line 30 is connected to a data receiving unit 32 and also to a clock separator circuit 33 and a cycle start frame detector circuit 34. The outputs of the separator circuit 33 and the detector circuit 34 are connected to counting and enabling inputs, respectively, of a counter 35. A predetermined count value is preset in the counter 35. Different count values are preset in each of the terminal units 28. The output of the counter 35 is applied to both the data receiving unit 32 and a data transmitting unit 36 with the data receiving unit being connected to the up-signal data line 31. The data receiving unit 32 receives the down-signal data A transmitted from the center 1 while the data transmission unit 36 delivers the up-data signal B which is particular to each of the terminal units 28.

The operation of the above-described embodiment will next be described. Various types of the signals and data as previously mentioned with reference to FIG. 3 are transmitted through the down-signal data line 30 to the terminal units 28. Those signal are applied to the clock separator circuit 33, the cycle start frame detector circuit 34, and the data receiving unit 32. Upon the presence of a cycle start frame signal a at the detector circuit 34, the detector circuit 34 actuates the counter 35 after which the data synchronizing frame signals b delivered from the clock separator circuit 33 are counted. The counter 35 counts down from the preset value in response to each of the data synchronizing frame signals b. When the preset value of the counter 35 becomes zero, a control signal is outputted therefrom which activates both the data receiving and transmitting units 32 and 36. In this manner, transmission and reception on the lines 30 and 31 are carried out simultaneously. That is, the down-data signal A is received from the center 1 while simultaneously the up-data signal B is transmitted to the center 1. This occurs at the time of the data period c as shown in FIG. 3. When transmission and reception of the up- and down- signals is completed, the operations of the terminal unit 28 are halted. Then, the terminal unit 28 is put in an inactive standby condition until the subsequent cycle start frame signal a is received.

Since different count values are preset in the counter 35 of each of the terminal units 28, data specific to each of the terminal units 28 is transmitted to or received from the center upon the presence of the data synchronizing frame signal b corresponding to the particular terminal unit. The transmission of the up-data signal B is held until the transmitting or receiving time for the particular terminal unit has come. After a data synchronizing frame signal b which corresponds to the preset value of the counter has been received, transmission is carried out all at once.

In the foregoing embodiment, if for instance, two thousand terminal units 28 are employed and 8-bit data is transmitted at intervals of ten seconds, the clock frequency is calculated as $(2000 \times 24 + 24)/10 = 4802.4$ Hz for the case where the cycle start frame signal a is 16 bits, the data synchronizing frame signal b is 8 bits, and the space d is 8 bits. Consequently, it is understood that the operations of the system are carried out at a relatively low speed. Further, if it is intended to carry out the transmitting and receiving operations once every second, 49 kilo-bits per second can be transmitted.

In the foregoing embodiment, the counter 35 is operated to count downwards in response to the data synchronization frame signal b. It is, of course, possible to count upwards and to carry out transmitting and receiving operations when the counter output has reached the preset value. Although the present invention has been described with respect to a specific embodiment, it will be appreciated by one skilled in the art that a variety of changes or modifications may be made without departing from the scope of the invention. For example, a radio or optical communications system may be employed instead of the lines.

The present invention is advantageous in that the construction of the terminal unit is simple and effective utilization of the system is achieved if a relatively small number of terminal units are located in a limited area and those terminal units are under central control.

What is claimed is:

1. A bi-directional data communications system comprising:
   a center facility, said center facility transmitting at predetermined intervals a cycle start frame signal and a plurality of synchronizing frame signals for each start frame signal;
   a down-data line connected to said center facility for transmission of first data said start frame signal and said synchronizing frame signal from said center facility to terminal control units and an up-data line connected to said center facility for transmission of second data from said terminal control units to said center facility; and
   a plurality of terminal control units coupled to said up-data line and said down-data line, each said terminal control unit comprising a counter, said counter being initialized by said cycle start frame signal received upon said down-data line and said counter counting in response to said synchronizing frame signals received on said down-data line, and means for simultaneously transmitting said second data to said center facility on said up-data line and receiving said first data from said center facility on said down-data line when the count output value from said counter reaches a predetermined value.

2. The bi-directional data communications system of claim 1 wherein said counter is preset with a number particular to the terminal control unit containing said counter and wherein said counter counts downwards in response to said data synchronizing frame signals.

3. The bi-directional data communications system of claim 1 wherein said counter counts upwards in response to said data synchronizing frame signals and further comprising means for comparing the count output from said counter with a pre-stored number particular to the control unit containing said counter.

4. The bi-directional data communications system of any of claims 1-3 wherein said up-data line and said down-data line each comprise wire lines.

5. The bi-directional data communications system of any of claims 1-3 wherein said up-data line and said down-data line comprise radio links operating upon different frequencies.

6. The bi-directional data communications system of any of claims 1-3 wherein said up-data line and said down-data line each comprise an optical fiber.

* * * * *